(12) United States Patent
Shimamoto et al.

(10) Patent No.: US 8,671,316 B2
(45) Date of Patent: Mar. 11, 2014

(54) IMAGE PROCESSING APPARATUS (75) Inventors: Kunihiko Shimamoto, Osaka (JP);
Yuya Tagami, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/452,012

(22) Filed: Apr. 20, 2012

(65) Prior Publication Data
US 2012/0278670 A1  Nov. 1, 2012

(30) Foreign Application Priority Data

Apr. 27, 2011 (JP) ................. 2011-098981

(51) Int. Cl.
*G06F 11/277* (2006.01)
*G06F 11/30* (2006.01)

(52) U.S. Cl.
USPC ............ 714/704; 382/183; 382/235; 702/191

(58) Field of Classification Search
None
See application file for complete search history.

(56) References Cited

U.S. PATENT DOCUMENTS

| | | | |
|---|---|---|---|
| 2007/0069026 A1* | 3/2007 | Aoyama | 235/462.09 |
| 2007/0177912 A1* | 8/2007 | Ikeda | 399/301 |
| 2008/0222462 A1* | 9/2008 | Sakata | 714/704 |
| 2009/0034787 A1 | 2/2009 | Sato et al. | |

FOREIGN PATENT DOCUMENTS

JP  2009-55582  3/2009

* cited by examiner

*Primary Examiner* — Ajay Bhatia
*Assistant Examiner* — Dipakkumar Gandhi (57) ABSTRACT

An image processing apparatus of the present disclosure includes: a two-dimensional matrix barcode decoding unit configured to decode a two-dimensional matrix barcode in an image of image data; and a restoration determining unit configured (a) to obtain an error detection rate and error detection position information detected while the two-dimensional matrix barcode is decoded, (b) to compare the error detection rate with a predetermined threshold value, (c) on the basis of the comparison result, to determine whether the two-dimensional matrix barcode should be restored, and (d) to adjust the threshold value according to an error detection position determined from the error detection position information.

6 Claims, 8 Drawing Sheets

IMAGE PROCESSING APPARATUS

CROSS-REFERENCE TO RELATED APPLICATION

This application relates to and claims priority rights from a Japanese Patent Application: No. 2011-098981, filed on Apr. 27, 2011, the entire disclosures of which are hereby incorporated by reference herein.

BACKGROUND OF THE INVENTION

1. Field of the Invention

The present invention relates to image processing apparatuses.

2. Description of the Related Art

Recently, two-dimensional matrix barcodes are widely used, such as QR code (trademark). Hereinafter, "two-dimensional matrix barcode" is simply described as "2D code." A technique is proposed that if an error detection rate is equal to or greater than a predetermined value due to a broken part of a 2D code when the 2D code is read, then a new 2D code is generated on the basis of information obtained by decoding the 2D code, and the original partially-broken 2D code is replaced with the new 2D code.

Some 2D codes broken with a stain or a chip may not be detected, or even if detected, such broken code may not be decoded properly.

In the aforementioned technique, on the basis of the error detection rate, it is determined whether the 2D code is restored or not. However, even under the same error detection rate, different broken positions in the 2D code result in different possibilities that the 2D code will not be detected and different possibilities that the 2D code will not be decoded properly when the breakage is progressed thereafter.

Therefore, in the aforementioned technique, even if the error detection rate is less than the predetermined value, the 2D code may not be detected or decoded properly in a relatively short time after the 2D code is detected or decoded properly.

SUMMARY OF THE INVENTION

An image processing apparatus according to an aspect of the present disclosure includes: a two-dimensional matrix barcode decoding unit configured to decode a two-dimensional matrix barcode in an image of image data; and a restoration determining unit configured (a) to obtain an error detection rate and error detection position information detected while the two-dimensional matrix barcode is decoded, (b) to compare the error detection rate with a predetermined threshold value, (c) on the basis of the comparison result, to determine whether the two-dimensional matrix barcode should be restored, and (d) to adjust the threshold value according to an error detection position determined from the error detection position information.

Therefore, in the consideration of not only the error detection rate but the error detection position information, it is determined whether the 2D code should be restored or not, and consequently, this determination is executed correctly. In other words, it tends to restore the 2D code which may not be detected and/or decoded in the near future.

These and other objects, features and advantages of the present invention will become more apparent upon reading of the following detailed description along with the accompanied drawings.

DETAILED DESCRIPTION

Hereinafter, embodiments according to aspects of the present disclosure will be explained with reference to drawings.

Embodiment 1

Figure 1:
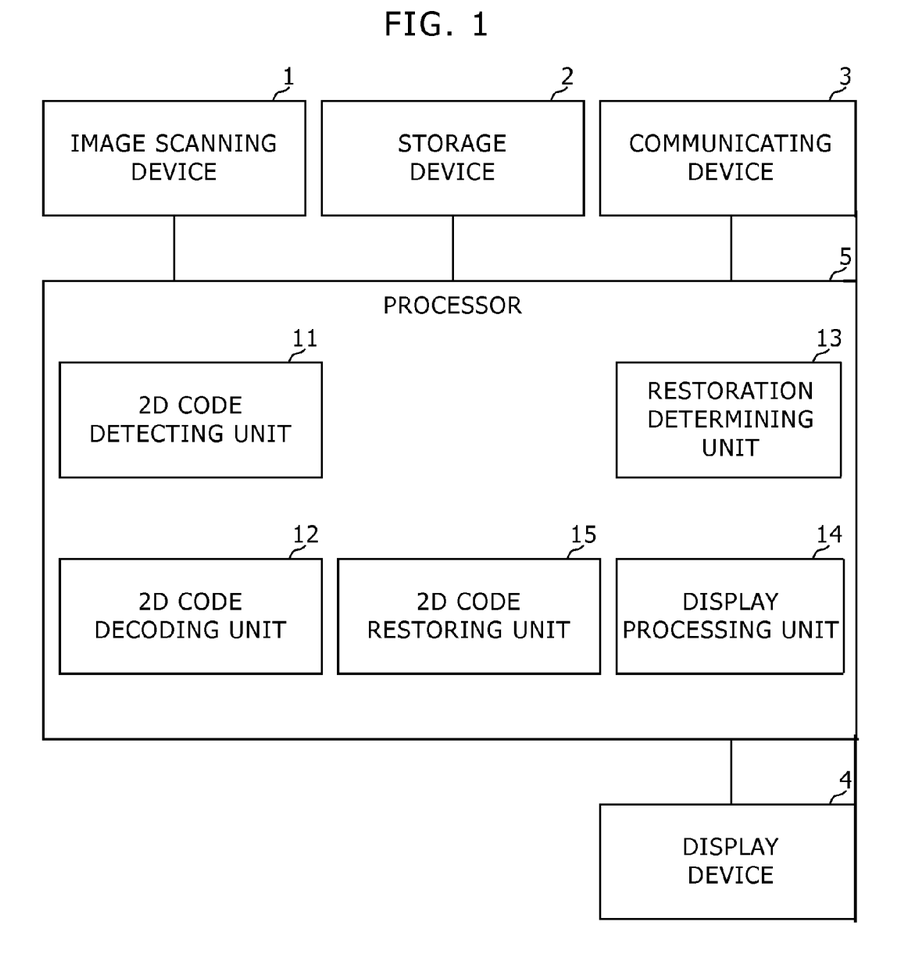
FIG. 1 shows a block diagram which indicates a configuration of an image processing apparatus according to Embodiment 1 of the present disclosure.

FIG. 1 shows a block diagram which indicates a configuration of an image processing apparatus according to Embodiment 1 of the present disclosure. This image processing apparatus includes an image scanning device 1, a storage device 2, a communicating device 3, a display device 4, and a processor 5.

The image scanning device 1 is an internal device which optically scans a document image from a document, and generates image data of the document image.

The storage device 2 is a device capable of storing data and programs. A non-volatile storage medium with a large capacity is used as the storage device 2, such as non-volatile memory or hard disk drive. The storage device 2 is capable of storing the document data.

The communicating device 3 is a device which performs data communication with an external device. A network interface which performs network communication or a modem which performs facsimile communication is used as the communicating device 3.

The display device 4 displays information to a user. For example, a liquid crystal display is used as the display device 4.

The processor 5 is a computer which includes a CPU (Central Processing Unit), a ROM (Read Only Memory), and a RAM (Random Access Memory), loads a program from the ROM or the storage device 2 to the RAM, and executes the program with the CPU to form various processing units. In this embodiment, in the processor 5, are formed a 2D code detecting unit 11, a 2D code decoding unit 12, a restoration determining unit 13, a display processing unit 14, a 2D code restoring unit 15, and so forth.

The 2D code detecting unit 11 detects a 2D code if an image of image data includes the 2D code. In this embodiment, a QR code (trademark) is used as the 2D code. The 2D code detecting unit 11 searches for position detection patterns in the image of the image data. If the 2D code detecting unit 11 finds all position detection patterns required for decoding a 2D code (for example, for QR code (trademark), three position detection patterns are required), the 2D code detecting unit 11 determines that the 2D code is detected in the image.

The 2D code decoding unit 12 extracts original information by decoding a 2D code, if the 2D code is detected by the 2D code detecting unit 11. If an error is found in the 2D code while decoding the 2D code, the 2D code decoding unit 12 performs error correction, memorizes a position in which the error correction occurs, and calculates an error detection rate on the whole 2D code. The error detection rate is a ratio of error-corrected bits to the total data amount of the 2D code. If one bit corresponds to one cell in the 2D code, the error detection rate is a ratio of error-corrected area to the whole area of the 2D code.

From the 2D code decoding unit 12, the restoration determining unit 13 obtains the error detection rate and the error detection position information detected while the 2D code is decoded. The restoration determining unit 13 compares the error detection rate with a predetermined threshold value, and on the basis of the comparison result, determines whether the 2D code should be restored. Specifically, the restoration determining unit 13 adjusts the threshold value according to an error detection position determined from the error detection position information, and compares the error detection rate with the adjusted threshold value.

In Embodiment 1, if the error detection position is in a predetermined area adjacent to a detection pattern in the 2D code, then the restoration determining unit 13 lowers this threshold value.

The display processing unit 14 causes the display device 4 to display a warning message (for example, "Restoration is required for this 2D code."), if the restoration determining unit 13 determines that the 2D code should be restored.

If the restoration determining unit 13 determines that the 2D code should be restored, then the 2D code restoring unit 15 generates a new 2D code by encoding the original information which the 2D code decoding unit 12 obtains by decoding, and replaces the 2D code in the image data with the new 2D code.

Figure 2:
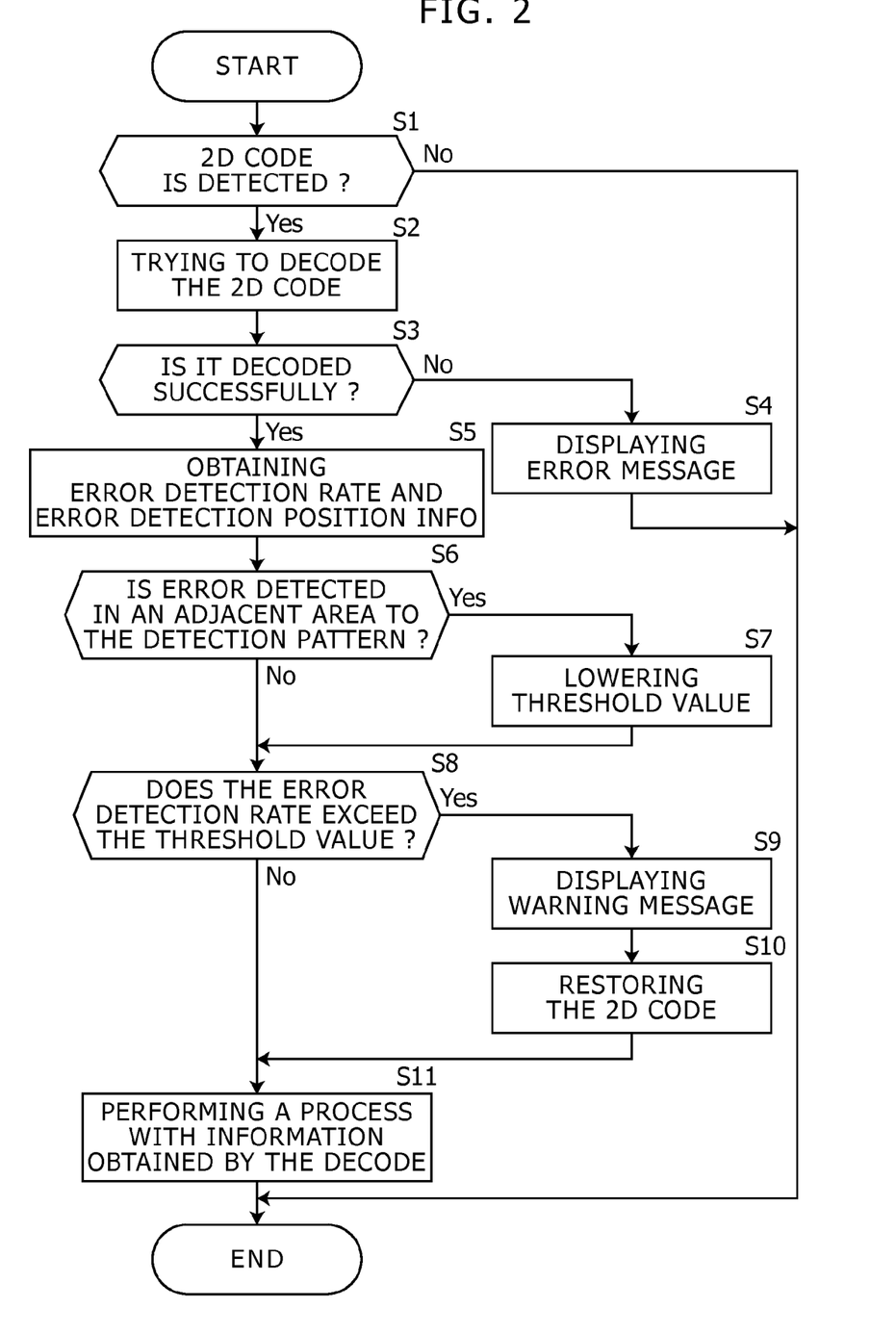
FIG. 2 shows a flowchart which explains a behavior of the image processing apparatus according to Embodiment 1.

In the following part, a behavior of the image processing apparatus in Embodiment 1 is explained. FIG. 2 shows a flowchart which explains a behavior of the image processing apparatus according to Embodiment 1.

This image processing apparatus processes image data provided from the image scanning device 1, image data in the storage device 2, image data received by the communicating device 3, and so forth.

The 2D code detecting unit 11 tries to detect a 2D code in an image of image data to be processed (Step S1). Specifically, the 2D code detecting unit 11 tries to detect a detection pattern of the 2D code, and determines that a 2D code exists in the image, if the detection pattern is detected. Thus, in this case, the 2D code is detected. Contrary to this, if the detection pattern is not detected, then it is determined that a 2D code does not exist in the image. Thus, in this case, the 2D code is not detected.

If the 2D code detecting unit 11 does not detect any 2D codes in Step S1, then this process is terminated. Otherwise, if a 2D code is detected in Step S1, then the 2D code decoding unit 12 tries to decode the 2D code on the basis of position information on the detection pattern obtained by the 2D code detecting unit 11 (Step S2).

If decoding the 2D code is failed (Step S3), then the display processing unit 14 causes the display device 4 to display an error message (Step S4), and this process is terminated thereafter.

Otherwise, if the 2D code decoding unit 12 decodes the 2D code successfully (Step S3), then the restoration determining unit 13 obtains an error detection rate and error detection position information of this 2D code from the 2D code decoding unit 12 (Step S5).

The restoration determining unit 13 determines whether an error detection position determined from the error detection position information is in a predetermined area adjacent to the detection pattern (Step S6). Specifically, the restoration determining unit 13 determines whether at least N error detection position(s) is/are in the predetermined area adjacent to the detection pattern. Here, "N" is a predetermined number such as one or more.

If the N or more error detection position(s) is/are in the predetermined area adjacent to the detection pattern, then the restoration determining unit 13 lowers a threshold value of the error detection rate (Step S7). The restoration determining unit 13 may lower the threshold value by a predetermined value, or may lower the threshold value by a value corresponding to the number of the error detection positions in the predetermined area adjacent to the detection pattern.

Otherwise, if the N error detection position(s) is/are not in the predetermined area adjacent to the detection pattern, then the restoration determining unit 13 does not adjust the threshold value, i.e. the threshold value keeps a default value.

The restoration determining unit 13 compares the error detection rate with the threshold value (which might be lowered in Step S7), and determines whether the error detection rate exceeds the threshold value (Step S8). If the error detection rate exceeds the threshold value, then the display processing unit 14 causes the display device 4 to display a message which prompts to restore the 2D code (Step S9). While displaying the message, if a predetermined user operation is detected by an unshown input device, then the 2D code restoring unit 15 restores the 2D code, and replaces the 2D code with a new 2D code obtained by the restoration (Step S10).

Further, a predetermined process is performed on the basis of information obtained by decoding the 2D code (Step S11).

In the aforementioned Embodiment 1, the restoration determining unit 13 (a) obtains an error detection rate and error detection position information detected while a 2D code is decoded, (b) compares the error detection rate with a predetermined threshold value, and (c) determines whether the 2D code should be restored, on the basis of the comparison result. Moreover, the restoration determining unit 13 adjusts the threshold value according to an error detection position determined from the error detection position information.

Therefore, in the consideration of not only the error detection rate but the error detection position information, it is determined whether the 2D code should be restored or not, and consequently, this determination is executed correctly.

Further, in Embodiment 1, if the N or more error detection position(s) is/are in a predetermined area adjacent to a detection pattern in the 2D code, then the restoration determining unit 13 lowers the threshold value of the error detection rate.

Therefore, if the adjacent area of the detection pattern is broken, the restoration determining unit 13 tends to determine that the 2D code should be restored, and consequently, in advance, it prevents a detection error of the 2D code supposed to occur due to breakage of the detection pattern.

Embodiment 2

Figure 3:
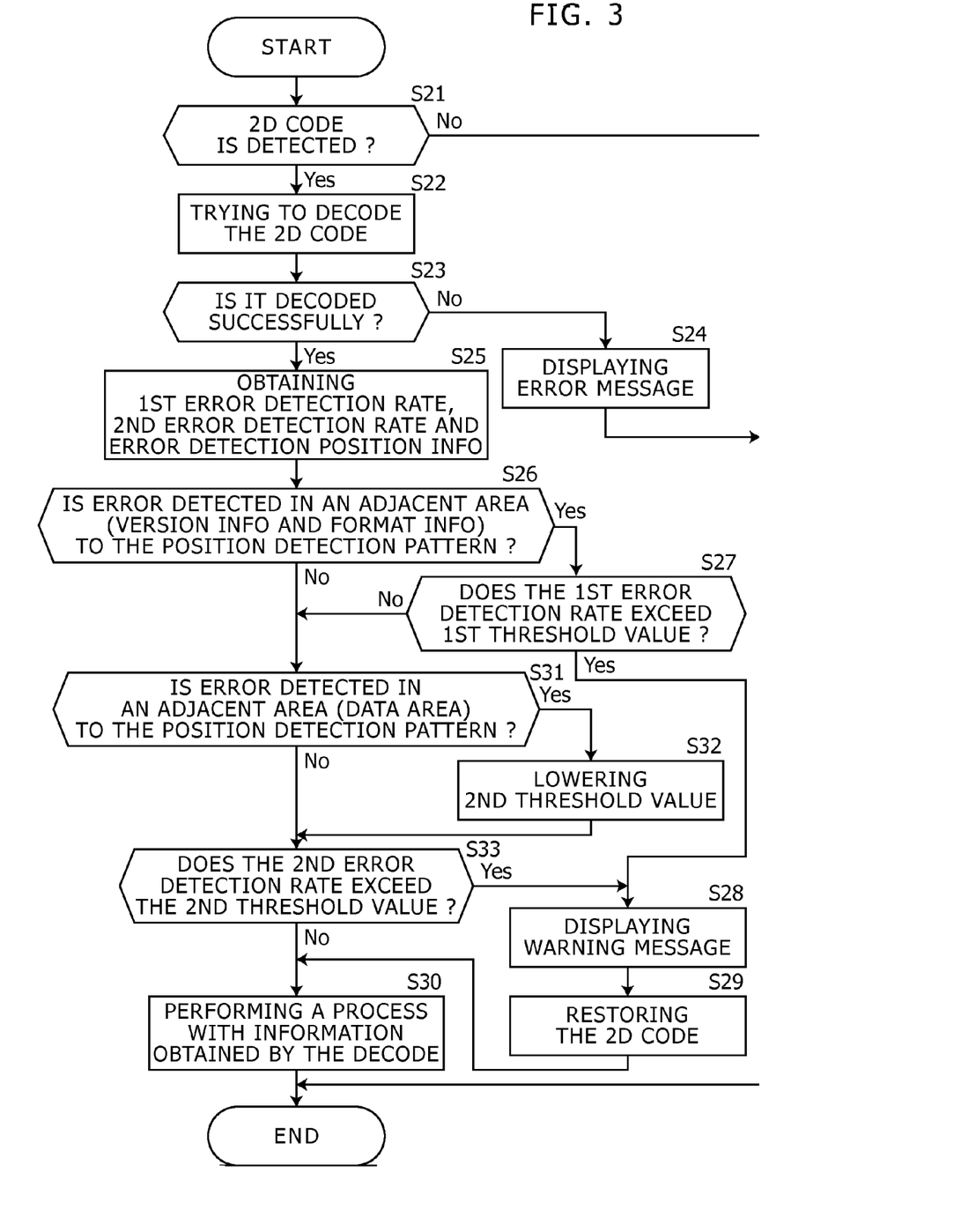
FIG. 3 shows a flowchart which explains a behavior of the image processing apparatus according to Embodiment 2.

An image processing apparatus in Embodiment 2 of this disclosure performs restoration determination of a QR code (trademark). Basic configuration of the image processing apparatus in Embodiment 2 is similar to that in Embodiment 1, but the restoration determining unit 13 in Embodiment 2 acts as follows.

In Embodiment 2, firstly, the restoration determining unit 13 obtains a first error detection rate, a second error detection rate, and the error detection position information from the 2D code decoding unit 12. This first error detection rate is an error detection rate on an area including format information and version information adjacent to a position detection pattern, and this second error detection rate is an error detection rate on a predetermined data area adjacent to a position detection pattern. Secondly, the restoration determining unit 13 compares the first error detection rate with a predetermined first threshold value, and determines whether the 2D code should be restored, on the basis of the comparison result of the first error detection rate; and compares the second error detection rate with a predetermined second threshold value, and determines whether the 2D code should be restored, on the basis of the comparison result of the second error detection rate. In this process, the restoration determining unit 13 adjusts the second threshold value according to an error detection position determined from the error detection position information.

In the following part, a behavior of the image processing apparatus in Embodiment 2 is explained. FIG. 3 shows a flowchart which explains a behavior of the image processing apparatus according to Embodiment 2.

The 2D code detecting unit 11 tries to detect a 2D code in an image of image data to be processed (Step S21). If any 2D codes are not detected in Step S21, then this process is terminated. Otherwise, if a 2D code is detected in Step S21, then the 2D code decoding unit 12 tries to decode the 2D code on the basis of position information on a position detection pattern obtained by the 2D code detecting unit 11 (Step S22). If decoding the 2D code is failed (Step S23), then the display processing unit 14 causes the display device 4 to display an error message (Step S24), and this process is terminated thereafter.

In Embodiment 2, the 2D code decoding unit 12 memorizes an error detection position per error as error detection position information while decoding the 2D code, and calculates the first and the second error detection rates after decoding the 2D code.

Otherwise, if the 2D code decoding unit 12 decodes the 2D code successfully (Step S23), then the restoration determining unit 13 obtains the first error detection rate, the second error detection rate, and the error detection position information of this 2D code from the 2D code decoding unit 12 (Step S25).

The restoration determining unit 13 determines whether an error detection position determined from the error detection position information is in areas including format information and version information adjacent to the position detection pattern (Step S6). Specifically, the restoration determining unit 13 determines whether at least Na error detection position(s) is/are in the areas including format information and/or version information adjacent to the position detection pattern. Here, "Na" is a predetermined number such as one or more.

If the Na or more error detection position(s) is/are in the area including the format information and the version information, then the restoration determining unit 13 compares the first error detection rate with a first threshold value, and determines whether the first error detection rate exceeds the first threshold value (Step S27).

If the first error detection rate exceeds the first threshold value, then the display processing unit 14 causes the display device 4 to display a message which prompts to restore the 2D code (Step S28). While displaying the message, if a predetermined user operation is detected by an unshown input device, then the 2D code restoring unit 15 restores the 2D code, and replaces the 2D code with a new 2D code obtained by the restoration (Step S29). Further, a predetermined process is performed on the basis of information obtained by decoding the 2D code (Step S30).

Otherwise, if the first error detection rate does not exceed the first threshold value, then the restoration determining unit 13 determines whether an error detection position determined from the error detection position information is in a predetermined data area adjacent to the position detection pattern (Step S31). The "data area" means an area having information obtained by encoding original information in QR code (trademark). Specifically, the restoration determining unit 13 determines whether at least Nb error detection position(s) is/are in the predetermined data area adjacent to the position detection pattern. Here, "Nb" is a predetermined number such as one or more.

If the Nb or more error detection position(s) is/are in the data area adjacent to the position detection pattern, then the restoration determining unit 13 lowers the second threshold value of the error detection rate (Step S32). The restoration determining unit 13 may lower the threshold value by a predetermined value, or may lower the threshold value by a value corresponding to the number of the error detection positions in the data area adjacent to the position detection pattern.

Otherwise, if the Nb error detection position(s) is/are not in the data area adjacent to the position detection pattern, then the restoration determining unit 13 does not adjust the second threshold value, i.e. the second threshold value keeps a default value.

The restoration determining unit 13 compares the second error detection rate with the second threshold value (which might be lowered in Step S32), and determines whether the second error detection rate exceeds the second threshold value (Step S33). If the second error detection rate exceeds the second threshold value, then the display processing unit causes the display device 4 to display a message which prompts to restore the 2D code (Step S28). While displaying the message, if a predetermined user operation is detected by an unshown input device, then the 2D code restoring unit 15 restores the 2D code, and replaces the 2D code with a new 2D code obtained by the restoration (Step S29). Further, a predetermined process is performed on the basis of information obtained by decoding the 2D code (Step S30).

Otherwise, if the second error detection rate does not exceed the second threshold value, then without displaying the warning message and restoring the 2D code, a predetermined process is performed on the basis of information obtained by decoding the 2D code (Step S30).

Figure 4A:
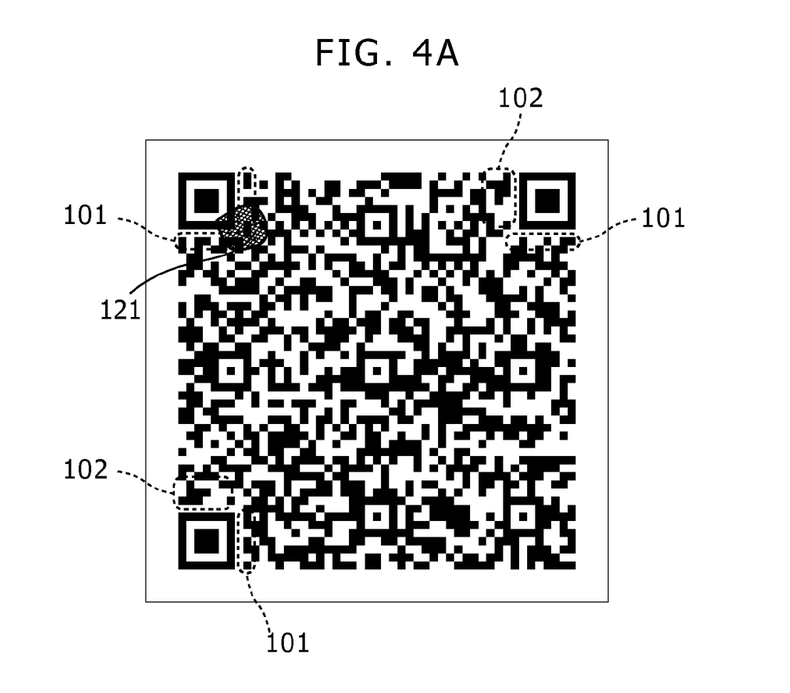
FIGS. 4A and 4B show diagrams which indicate examples of QR codes (trademark) from which errors are detected.
Figure 4B:
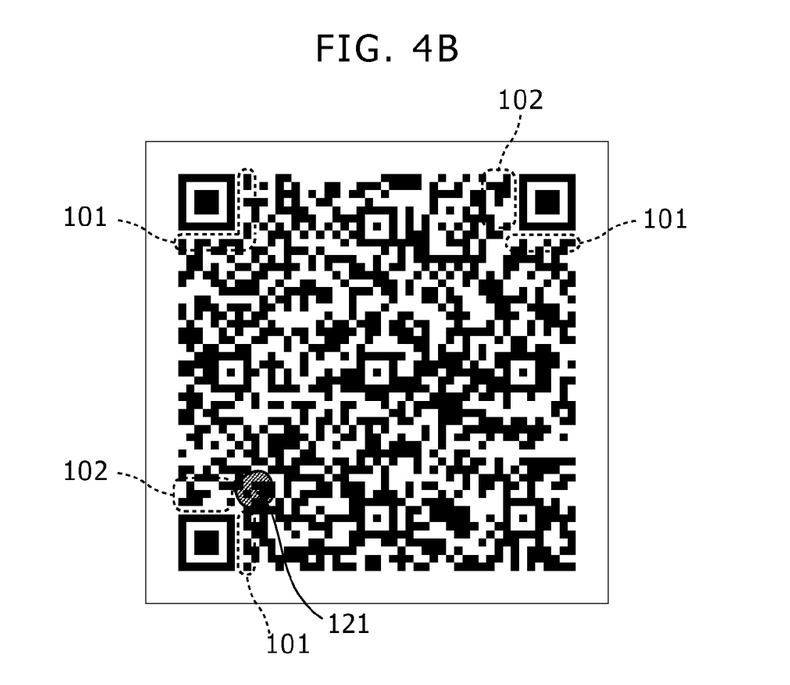

FIGS. 4A and 4B show diagrams which indicate examples of QR codes (trademark) from which errors are detected. FIG. 4A shows a diagram which indicates an example of QR code (trademark) in which a stain 121 covers an area 101 including format information. In the case shown in FIG. 4A, at least an error is detected while decoding the area 101 of the format information. FIG. 4B shows a diagram which indicates an example of QR code (trademark) in which a stain 121 covers a data area. In the case shown in FIG. 4B, at least an error is detected while decoding the data area, that is, off the area 101 of the format information and the area 102 of the version information.

In the aforementioned Embodiment 2, firstly, the restoration determining unit 13 obtains a first error detection rate, a second error detection rate, and error detection position information. This first error detection rate is an error detection rate in an area including format information and version information adjacent to a position detection pattern, and this second error detection rate is an error detection rate in a predetermined data area adjacent to a position detection pattern. Secondly, the restoration determining unit 13 compares the first error detection rate with a predetermined first threshold value, and determines whether the 2D code should be restored, on the basis of the comparison result of the first error detection rate; and compares the second error detection rate with a predetermined second threshold value, and determines whether the 2D code should be restored, on the basis of the comparison result of the second error detection rate. In this process, the restoration determining unit 13 adjusts the second threshold value according to an error detection position determined from the error detection position information.

Therefore, if the adjacent area of the position detection pattern is broken, the restoration determining unit 13 tends to determine that the 2D code should be restored, and consequently, in advance, it prevents a detection error of the 2D code supposed to occur due to breakage of the detection pattern.

Embodiment 3

Figure 5:
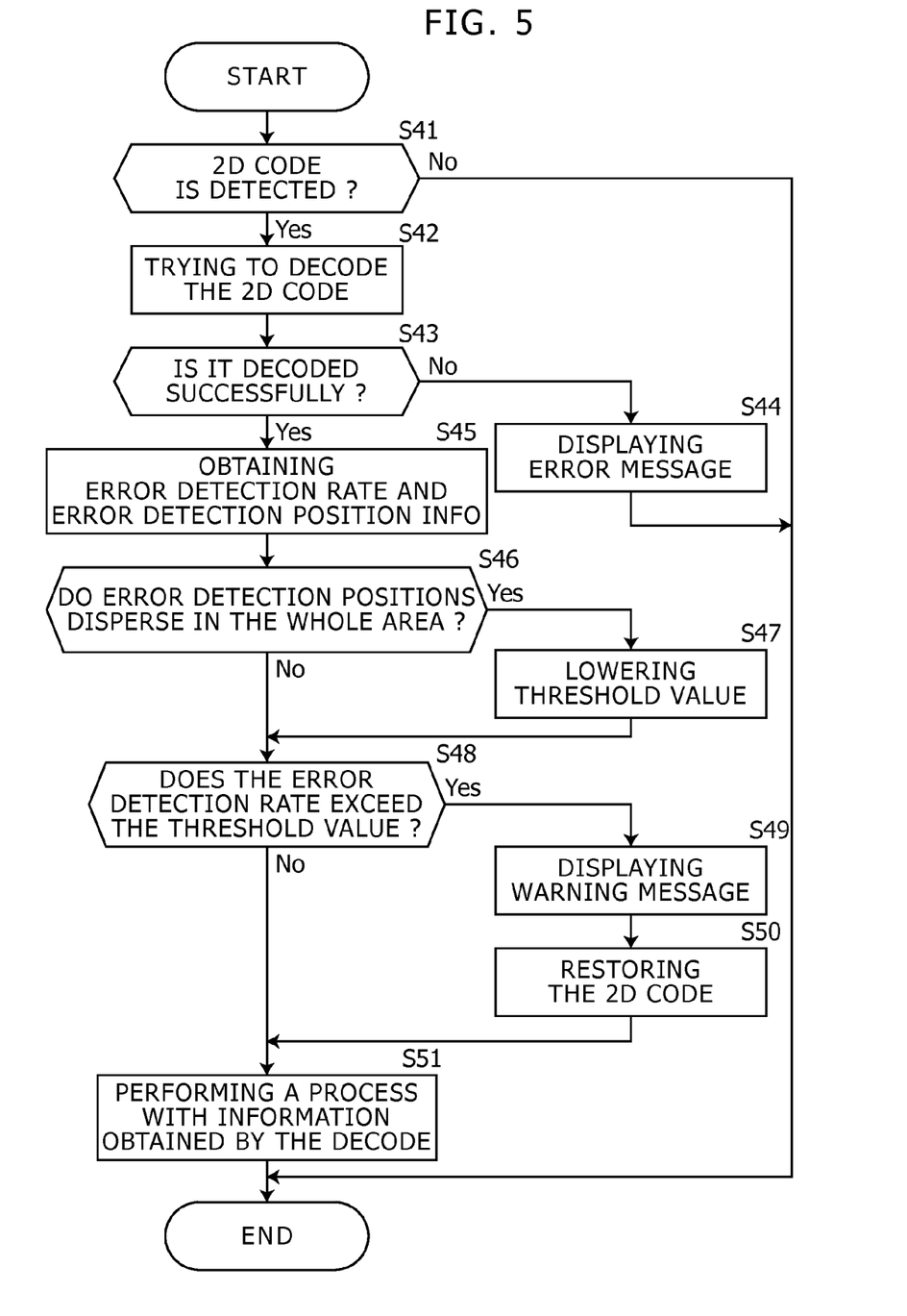
FIG. 5 shows a flowchart which explains a behavior of the image processing apparatus according to Embodiment 3.

An image processing apparatus in Embodiment 3 of this disclosure performs restoration determination in a different manner from those of Embodiments 1 and 2. Basic configuration of the image processing apparatus in Embodiment 3 is similar to that in Embodiment 1 or 2, but the restoration determining unit 13 in Embodiment 3 acts as follows.

In Embodiment 3, the restoration determining unit 13 determines whether error detection positions determined from the error detection position information disperse in the whole area of the 2D code, and lowers the aforementioned threshold value to be adjusted if the error detection positions disperse in the whole area. For example, the restoration determining unit 13 calculates average values of the error detection positions in respective coordinates (X, Y), calculates variances or standard deviations on the basis of the average values and the error detection positions in respective coordinates (X, Y), and determines that the error detection positions disperse in the 2D code if the variances or the standard deviations exceed predetermined threshold values.

In the following part, a behavior of the image processing apparatus in Embodiment 3 is explained. FIG. 5 shows a flowchart which explains a behavior of the image processing apparatus according to Embodiment 3.

The 2D code detecting unit 11 tries to detect a 2D code in an image of image data to be processed (Step S41). If any 2D codes are not detected in Step S41, then this process is terminated. Otherwise, if a 2D code is detected in Step S41, then the 2D code decoding unit 12 tries to decode the 2D code on the basis of position information on the detection pattern obtained by the 2D code detecting unit (Step S42). If decoding the 2D code is failed (Step S43), then the display processing unit 14 causes the display device 4 to display an error message (Step S44), and this process is terminated thereafter.

If the 2D code decoding unit 12 decodes the 2D code successfully (Step S43), then the restoration determining unit 13 obtains an error detection rate and error detection position information of this 2D code from the 2D code decoding unit 12 (Step S45).

The restoration determining unit 13 determines whether error detection positions determined from the error detection position information disperse in the whole area of the 2D code (Step S46).

If the error detection positions disperse in the whole area, then the restoration determining unit 13 lowers a threshold value of the error detection rate (Step S47). The restoration determining unit 13 may lower the threshold value by a predetermined value, or may lower the threshold value by a value corresponding to the variances or the standard deviations.

Figure 6:
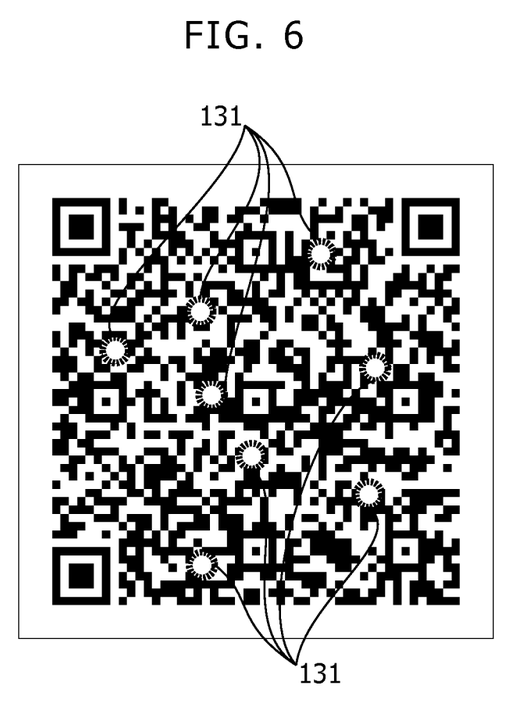
FIG. 6 shows a diagram which indicates an example of a QR code (trademark) in which error detection positions disperse.

FIG. 6 shows a diagram which indicates an example of a QR code (trademark) in which error detection positions 131 disperse.

Otherwise, if the error detection positions do not disperse in the whole area, then the restoration determining unit 13 does not adjust the threshold value of the error detection rate, i.e. the threshold value keeps a default value.

The restoration determining unit 13 compares the error detection rate with the threshold value (which might be lowered in Step S47), and determines whether the error detection rate exceeds the threshold value (Step S48). If the error detection rate exceeds the threshold value, then the display processing unit 14 causes the display device 4 to display a message which prompts to restore the 2D code (Step S49). While displaying the message, if a predetermined user operation is detected by an unshown input device, then the 2D code restoring unit 15 restores the 2D code, and replaces the 2D code with a new 2D code obtained by the restoration (Step S50).

Further, a predetermined process is performed on the basis of information obtained by decoding the 2D code (Step S51).

In the aforementioned Embodiment 3, if the error detection positions disperse in the whole area of the 2D code, then the restoration determining unit 13 lowers the threshold value of the error detection rate.

In general, if aging results in breakage of the 2D code, error detection positions disperse in the whole area of the 2D code. Therefore, in advance, it prevents a detection error of the 2D code supposed to occur due to the breakage by aging of the 2D code.

Embodiment 4

Figure 7:
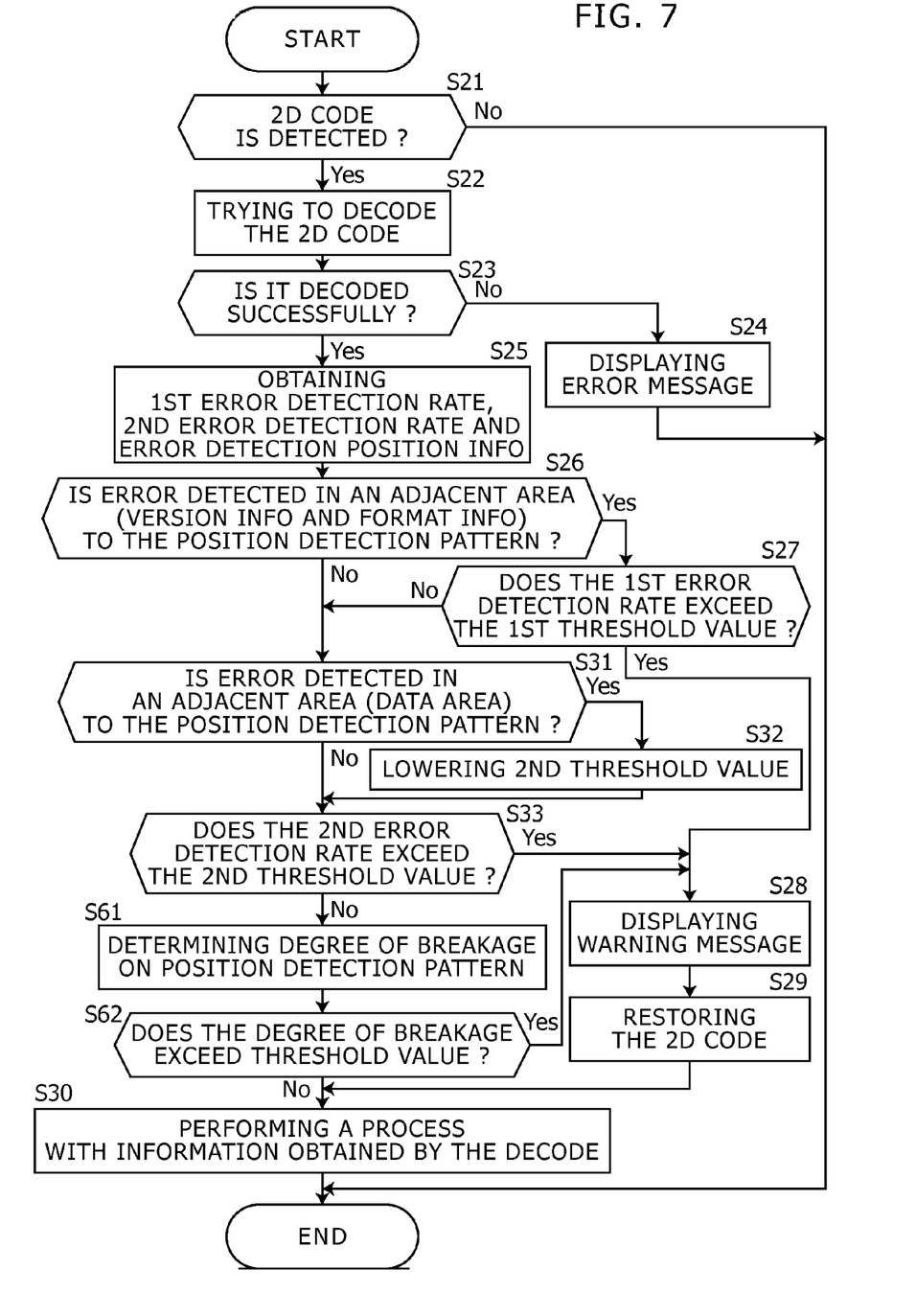
FIG. 7 shows a flowchart which explains a behavior of the image processing apparatus according to Embodiment 4.

An image processing apparatus in Embodiment 4 of this disclosure performs restoration determination based on a degree of breakage on a position detection pattern in addition to the restoration determination of Embodiment 2. Basic configuration of the image processing apparatus in Embodiment 4 is similar to that in Embodiment 2, but the restoration determining unit 13 in Embodiment 4 acts as follows. In Embodiment 4, the 2D code is a QR code (trademark).

FIG. 7 shows a flowchart which explains a behavior of the image processing apparatus according to Embodiment 4.

In Embodiment 4, in addition to the restoration determination of Embodiment 2, the restoration determining unit 13 determines a degree of breakage on a position detection pattern in the 2D code (Step S61), and determines that the 2D code should be restored if the determined degree of breakage exceeds a predetermined threshold value (Step S62).

Figure 8A:
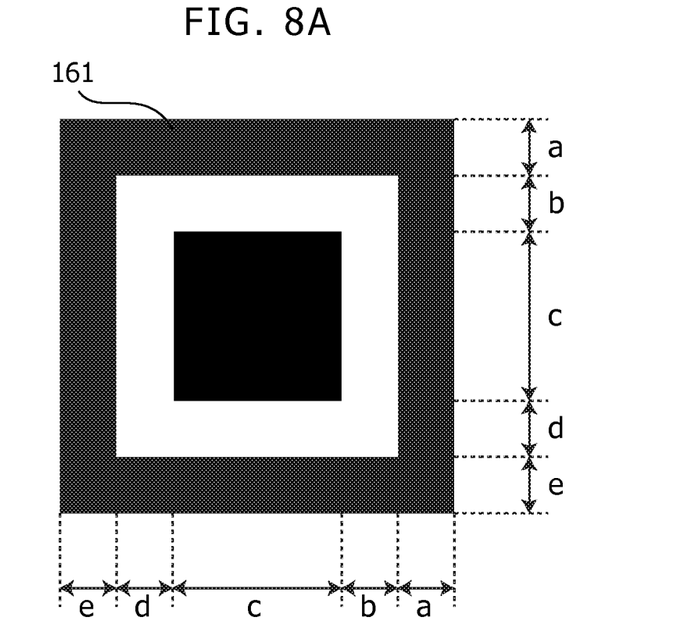
FIGS. 8A and 8B show diagrams which explain a degree of breakage on a position detection pattern.
Figure 8B:
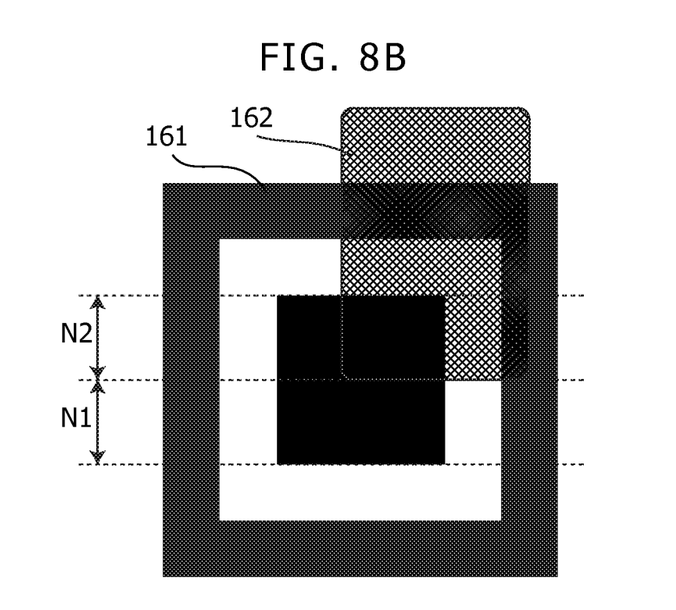

FIGS. 8A and 8B show diagrams which explain a degree of breakage on a position detection pattern. FIG. 8A shows a diagram which explains a shape of a position detection pattern 161. FIG. 8B shows a diagram which explains a degree of breakage on the position detection pattern 161. As shown in FIG. 8A, in a light-and-shade pattern on a straight line through the center of the position detection pattern 161, a length ratio a:b:c:d:e of alternate shade and light portions is defined as 1:1:3:1:1 in the standard.

As shown in FIG. 8B, if a stain 162 covers the position detection pattern 161, then some lines which have the light-and-shade pattern with the length ratio 1:1:3:1:1 are not detected from the position detection pattern 161, and therefore, the number N1 of such detected lines is smaller than the number of such lines detected from the position detection pattern 161 without the stain 162. The number N1 of the lines may be measured by the restoration determining unit 13, or may be measured by the 2D code detecting unit 11 when detecting the position detection pattern 161.

For example, if the number of such lines (i.e. having the light-and-shade pattern with the length ratio 1:1:3:1:1) detected from the position detection pattern 161 without breakage such as the stain 162 is expressed as "N1+N2", the degree of breakage is defined as "N2/(N1+N2)". The value of "N1+N2" may be calculated on the basis of (a) a unit length (e.g. the length of one of the light portions) determined from the light-and-shade pattern of 1:1:3:1:1 and (b) the number of lines per the unit length. Alternatively, the value of "N1+N2" may be memorized in advance as a constant value obtained by such calculation.

In FIGS. 8A and 8B, is explained a line with the light-and-shade pattern of 1:1:3:1:1 parallel to a side of the rectangular position detection pattern 161. If the rectangular position detection pattern 161 has been rotated in the image, then after detecting a rotation angle of the rectangular position detection pattern 161, the line with the light-and-shade pattern of 1:1:3:1:1 can be detected in the direction of the rotation angle from the side of the rectangular position detection pattern 161.

Other parts of the behavior of the image processing apparatus in Embodiment 4 are similar to those of Embodiment 2, and therefore, they are not explained here.

In the aforementioned Embodiment 4, the restoration determining unit 13 determines a degree of breakage on the 2D code, and determines whether the 2D code should be restored, on the basis of the determined degree of breakage.

Therefore, it prevents a detection error of the position detection pattern supposed to occur due to increasing the degree of the breakage, and consequently, in advance, it prevents a detection error of the 2D code due to the detection error of the position detection pattern.

The description of the present invention has been presented for purposes of illustration and description, and is not intended to be exhaustive or limited to the invention in the form disclosed.

In Embodiment 4, the restoration determination based on the degree of breakage on the position detection pattern 161 is added to the restoration determination of Embodiment 2. Further, the same restoration determination based on the degree of breakage may be added to the restoration determination of Embodiment 3.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
   a two-dimensional matrix barcode decoding unit configured to decode a two-dimensional matrix barcode in an image of image data; and
   a restoration determining unit configured (a) to obtain an error detection rate and error detection position information detected while the two-dimensional matrix barcode is decoded, (b) to compare the error detection rate with a predetermined threshold value, (c) on the basis of the comparison result, to determine whether the two-dimensional matrix barcode should be restored, and (d) to adjust the threshold value according to an error detection position determined from the error detection position information wherein:
   the restoration determining unit is further configured to lower the threshold value, if the error detection position is in a predetermined adjacent area to a detection pattern of the two-dimensional matrix barcode.

2. An image processing apparatus, comprising:
   a two-dimensional matrix barcode decoding unit configured to decode a two-dimensional matrix barcode in an image of image data; and
   a restoration determining unit configured (a) to obtain an error detection rate and error detection position information detected while the two-dimensional matrix barcode is decoded, (b) to compare the error detection rate with a predetermined threshold value, (c) on the basis of the comparison result, to determine whether the two-dimensional matrix barcode should be restored, and (d) to adjust the threshold value according to an error detection position determined from the error detection position information wherein:
   the two-dimensional matrix barcode is a QR code (trademark);
   a first error detection rate is an error detection rate in an area including format information and/or version information adjacent to a position detection pattern in the two-dimensional matrix barcode;
   a second error detection rate is an error detection rate in a predetermined data area adjacent to a position detection pattern in the two-dimensional matrix barcode; and
   the restoration determining unit is further configured (e) to obtain the first error detection rate, the second error detection rate, and the error detection position information, (f) to compare the first error detection rate with a predetermined first threshold value, (g) on the basis of the comparison result of the first error detection rate, to determine whether the two-dimensional matrix barcode should be restored, (h) to compare the second error detection rate with a predetermined second threshold value, (i) on the basis of the comparison result of the second error detection rate, to determine whether the two-dimensional matrix barcode should be restored, and (j) to adjust the second threshold value according to an error detection position determined from the error detection position information.

3. An image processing apparatus, comprising:
   a two-dimensional matrix barcode decoding unit configured to decode a two-dimensional matrix barcode in an image of image data; and
   a restoration determining unit configured (a) to obtain an error detection rate and error detection position information detected while the two-dimensional matrix barcode is decoded, (b) to compare the error detection rate with a predetermined threshold value, (c) on the basis of the comparison result, to determine whether the two-dimensional matrix barcode should be restored, and (d) to adjust the threshold value according to an error detection position determined from the error detection position information wherein:
   the restoration determining unit is further configured to lower the threshold value, if error detection positions determined from the error detection position information disperse in the two-dimensional matrix barcode.

4. The image processing apparatus according to claim 1, wherein:

the two-dimensional matrix barcode is a QR code (trademark); and the restoration determining unit is further configured to determine a degree of breakage on a position detection pattern in the two-dimensional matrix barcode, and on the basis of the degree of breakage, to determine whether the two-dimensional matrix barcode should be restored.

5. The image processing apparatus according to claim 4, wherein:

the degree of breakage corresponds to the number of lines having a predetermined light-and-shade pattern detected while detecting the position detection pattern.

6. The image processing apparatus according to claim 5, wherein:

the predetermined light-and-shade pattern includes alternate shade and light portions with a length ratio of 1:1:3:1:1.

* * * * *